United States Patent
Malkin (10) Patent No.: US 7,512,756 B2
(45) Date of Patent: Mar. 31, 2009

(54) PERFORMANCE IMPROVEMENT FOR BLOCK SPAN REPLICATION

(75) Inventor: Kirill Malkin, Morris Plains, NJ (US)

(73) Assignee: RELDATA, Inc., Parsippany, NJ (US)

( * ) Notice: Subject to any disclaimer, the term of this patent is extended or adjusted under 35 U.S.C. 154(b) by 308 days.

(21) Appl. No.: 11/470,537

(22) Filed: Sep. 6, 2006

(65) Prior Publication Data

US 2007/0055834 A1  Mar. 8, 2007

Related U.S. Application Data

(60) Provisional application No. 60/714,399, filed on Sep. 6, 2005.

(51) Int. Cl.
*G06F 13/00* (2006.01)
(52) U.S. Cl. .................. 711/162; 711/154; 711/168; 711/210
(58) Field of Classification Search .......... 711/154, 711/162, 168, 210
See application file for complete search history.

(56) References Cited

U.S. PATENT DOCUMENTS 7,111,147 B1 * 9/2006 Strange et al. .............. 711/209
2005/0154937 A1 * 7/2005 Achiwa ....................... 714/6
2006/0064444 A1 * 3/2006 van Ingen et al. ........... 707/204
2007/0288533 A1 * 12/2007 Srivastava et al. .......... 707/203
2008/0016293 A1 * 1/2008 Saika ........................ 711/154

OTHER PUBLICATIONS

"Information technology—SCSI Architecture Model—2 (SAM-2)," T10 Project 1157-D, Revision 24, Sep. 12, 2002, Ref. No. ISO/IEC 14776-412 : 200x, ANSI INCITS. ***:200x.
"Information technology—SCSI Primary Commands—4 (SPC-4)," Project T10/1731-D, Revision 1a, Sep. 5, 2005, Ref. No. ISO/IEC 14776-314 : 200x, ANSI INCITS. ***:200x.

* cited by examiner

*Primary Examiner*—Reba I Elmore
(74) *Attorney, Agent, or Firm*—Wayne F. Reinke, Esq.; Heslin Rothenber Farley & Mesiti P.C.

(57) ABSTRACT

The portion of a source block storage resource to be replicated, and the corresponding portion of the block storage resource being written to, are each divided into a predefined number of equal-sized spans. A digest calculation is then generated for each span in a corresponding pair and compared. If the digests do not match, those spans are divided into still smaller spans, and digests are calculated and compare iteratively, to identify smaller areas of discrepancies and reduce the number of blocks that are actually written.

39 Claims, 3 Drawing Sheets

PRIOR ART fig. 1 fig. 2 fig. 3 fig. 4 fig. 5

PERFORMANCE IMPROVEMENT FOR BLOCK SPAN REPLICATION

CROSS-REFERENCE TO RELATED APPLICATIONS

This application claims priority under 35 U.S.C. §119 to U.S. Provisional Application No. 60/714,399, filed Sep. 6, 2005, which is herein incorporated by reference in its entirety.

This application contains subject matter which is related to the subject matter of the following applications, each of which is assigned to the same assignee as this application and filed on the same day as this application. Each of the below listed applications is hereby incorporated herein by reference in its entirety:

U.S. patent application Ser. No. 11/470,551, by Kirill Malkin, entitled "STORAGE RESOURCE SCAN".

U.S. patent application Ser. No. 11/470,550, by Malkin et al., entitled "REDUNDANT APPLIANCE CONFIGURATION REPOSITORY IN STANDARD HIERARCHICAL FORMAT".

U.S patent application Ser. No. 11/470,548, by Malkin et al., entitled "LIGHTWEIGHT MANAGEMENT AND HIGH AVAILABILITY CONTROLLER".

U.S. patent application Ser. No. 11/470,545, by Malkin et al., entitled "BLOCK SNAPSHOTS OF iSCSI".

U.S. patent application Ser. No. 11/470,544, by Kirill Malkin, entitled "GENERATING DIGEST FOR BLOCK RANGE VIA iSCSI".

U.S. patent application Ser. No. 11/470,542, by Kirill Malkin, entitled "INCREMENTAL REPLICATION USING SNAPSHOTS".

U.S. patent application Ser. No. 11/470,539, by Dmitry Fomichev, entitled "REUSING TASK OBJECT AND RESOURCES".

BACKGROUND OF THE INVENTION

1. Technical Field

The present invention generally relates to data replication. More particularly, the present invention relates to identifying only reasonably sized storage blocks without checksums matching the destination for actual copying.

2. Background Information

As block storage resources on networks increase in size exponentially, replication of block storage resources becomes problematic, especially over communications links that are slow or have inadequate bandwidth. A full copy, the historical method for initializing a replication, is inefficient and may not be an option where the source storage resource is under high demand.

Thus, a need exists for a more efficient way to replicate data.

SUMMARY OF THE INVENTION

Briefly, the present invention satisfies the need for a more efficient way to replicate data by using digest calculations to minimize the number of blocks that must actually be copied.

In accordance with the above, it is an object of the present invention to provide a more efficient method of replicating data, particularly, large volumes of data.

The present invention provides, in a first aspect, a method of replicating data from a first block storage resource to a second block storage resource. Broadly, the method comprises identifying differences between a first block span of the first block storage resource and an equal-sized second block span of the second block storage resource, wherein the first block span and the second block span start at a same block number, and copying only those spans from the first block storage resource to the second that have differences.

The present invention provides, in a second aspect, a method of replicating data on a first block storage resource of a network. Initially, a local snapshot is taken of the first block storage resource. A copy of the contents of the first block storage resource is made from the snapshot. The copied contents are then restored on a second block storage resource of the network. Differences between the snapshot and the current state of the first block storage resource are then replicated using the first aspect of the invention. Optionally, the contents of the first block storage resource are stored and transported to the second block storage resource on a portable storage medium.

The method comprises, in a third aspect, a method of replicating data from a first block storage resource to a second block storage resource. The method comprises dividing a first portion of the first block storage resource and a second portion of the second block storage resource into at least two block span pairs, each block span pair comprising a block span from the first block storage resource and an equal-sized block span from the second block storage resource, wherein each block span of a given block span pair start at a same block number. The method further comprises performing digest calculations for each of the block spans of a block span pair, and comparing results of the digest calculations. If the digest calculations do not match, and each of the block spans of the block span pair are at least a minimum size, the first block span pair is divided into at least two smaller block span pairs, each smaller block span pair comprising a smaller block span from the first block storage resource and an equal-sized smaller block span from the second block storage resource, wherein each block span of a given block span pair start at a same block number. If the digest calculations do not match, and each of the block spans of the block span pair are smaller than a minimum size, the block span of the first block storage resource is designated for copying, and the performing, comparing dividing and designating are repeated until there are no more block span pairs.

These, and other objects, features and advantages of this invention will become apparent from the following detailed description of the various aspects of the invention taken in conjunction with the accompanying drawings.

DETAILED DESCRIPTION OF THE INVENTION

The invention improves performance for a block-by-block data replication of a large portion or all of a block storage resource, especially over a slow communications link. The portion of the block storage resource to be replicated, and the corresponding portion of the block storage resource being written to, are each divided into a predefined number of equal sized spans. A digest calculation is then generated for each span in a corresponding pair. The digest calculations are then compared. If they do not match, those spans are divided into still smaller spans successively, in an attempt to identify smaller areas of discrepancies, thereby reducing the number of blocks that are actually written.

The present invention also takes advantage of the SCSI Architecture Model-2 Specification (SAM-2), which allows equipment vendors to define their own SCSI commands. See the SAM-2 document at page 57, SAM-2 being incorporated by reference herein in its entirety. See also the SCSI Primary Commands-4 (SPC-4) document (Working Draft Revision 1a, 5 Sep. 2005 at page 27), which is also incorporated by reference herein in its entirety. A standard transport protocol, iSCSI, is used to send a non-standard, i.e., vendor-specific, command. In particular, a vendor-specific iSCSI command that will trigger a digest calculation is used to trigger a digest calculation.

Figure 1:
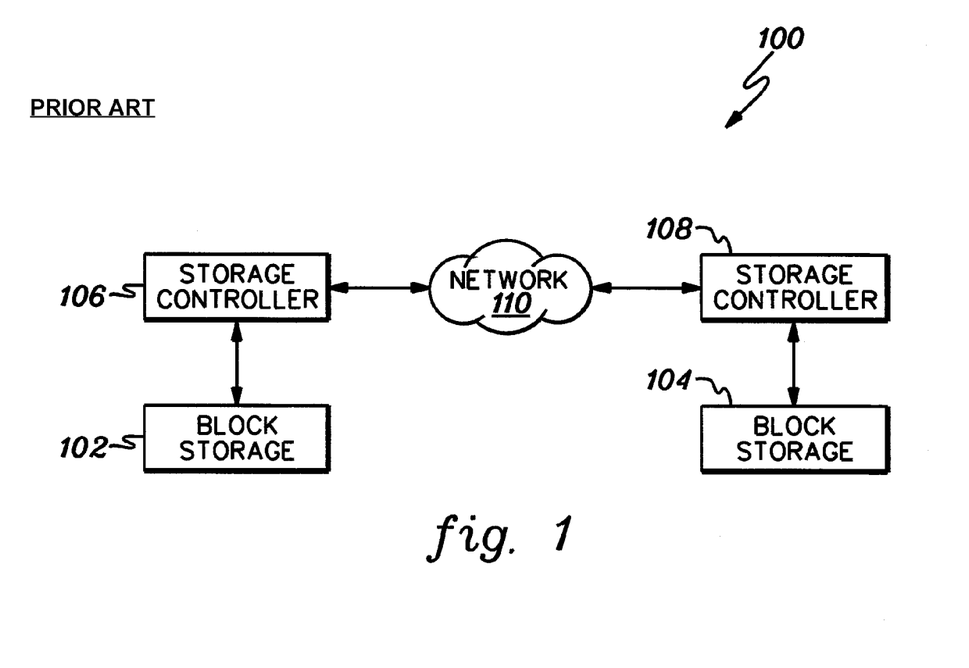
FIG. 1 is a block diagram of one example of a computing environment capable of implementing the present invention.

FIG. 1 depicts one example of a computing environment 100 capable of implementing the present invention when appropriately programmed. The computing environment comprises a network 110, for example, a local area network or wide area network. Assume for the present example that the network is a wide area network. Two network storage resources 102 and 104 of equal size, and starting at the same block number, provide storage to clients (not shown) on the remainder of the network. The network storage resources are, for example, hard disk drives or other block storage devices. Assume that the network storage resources are remote from each other. Consequently, each is associated with a storage controller, 106 and 108, respectively. The storage controllers control and manage network access to the storage resources.

As one skilled in the art will know, a block storage resource is a random-access storage resource that has data organized in equal-sized blocks, typically 512 bytes each. Each block can be written or read in its entirety, but one can't read or update less than the entire block. The blocks are numbered from 0 to the maximum number of blocks of the resource. Blocks are referenced by their numbers, and the access time for any block number is fairly similar across the entire resource. Blocks can also be grouped into equal size "chunks" of blocks. Hard disks, as well as compact flash and USB sticks, are examples of block storage resources.

Block storage resources can be physical or virtual. A physical storage resource is a physical device, such as a hard disk or a flash card, that has a fixed number of blocks that is defined during manufacturing or low-level formatting process, usually at the factory. A virtual block storage resource is a simulated device that re-maps its block numbers into the block numbers of a portion of one or more physical block storage resources. As just two examples, a virtual block storage resource with 2,000 blocks can be mapped to: (1) a single physical block storage resource with 10,000 blocks, starting at block 1,000 and ending at block 2,999; or (2) two physical block storage resources, one with 1,000 blocks and another with 5,000 blocks, starting at block 0 and ending at block 999 of the first resource, then starting at block 3,000 and ending at block 3,999 of the second resource. The examples herein assume the use of virtual block storage resources. However, it will be understood that physical block storage resources could instead be used.

In the present example, storage controllers 106 and 108 run some form of UNIX or a UNIX derivative operating system, preferably some form of LINUX. The operating system in the examples herein performs the replication, including taking the snapshots. In addition, the network uses iSCSI for data transfers to and from the network storage resources.

Assume now that it is desired to fully replicate the data from block storage resource 102 to block storage resource 104. In accordance with one aspect of the present invention, a method of replicating data from a first block storage resource to a second block storage resource is provided. One example of the method will be described with reference to computing environment 100 of FIG. 1 in conjunction with the flow diagram 200 of FIG. 2. The method can be implemented in software, preferably running on the side of the storage resource being replicated, though it could instead run on the replica side or even on a third-party computing unit coupled to both sides.

Figure 2:
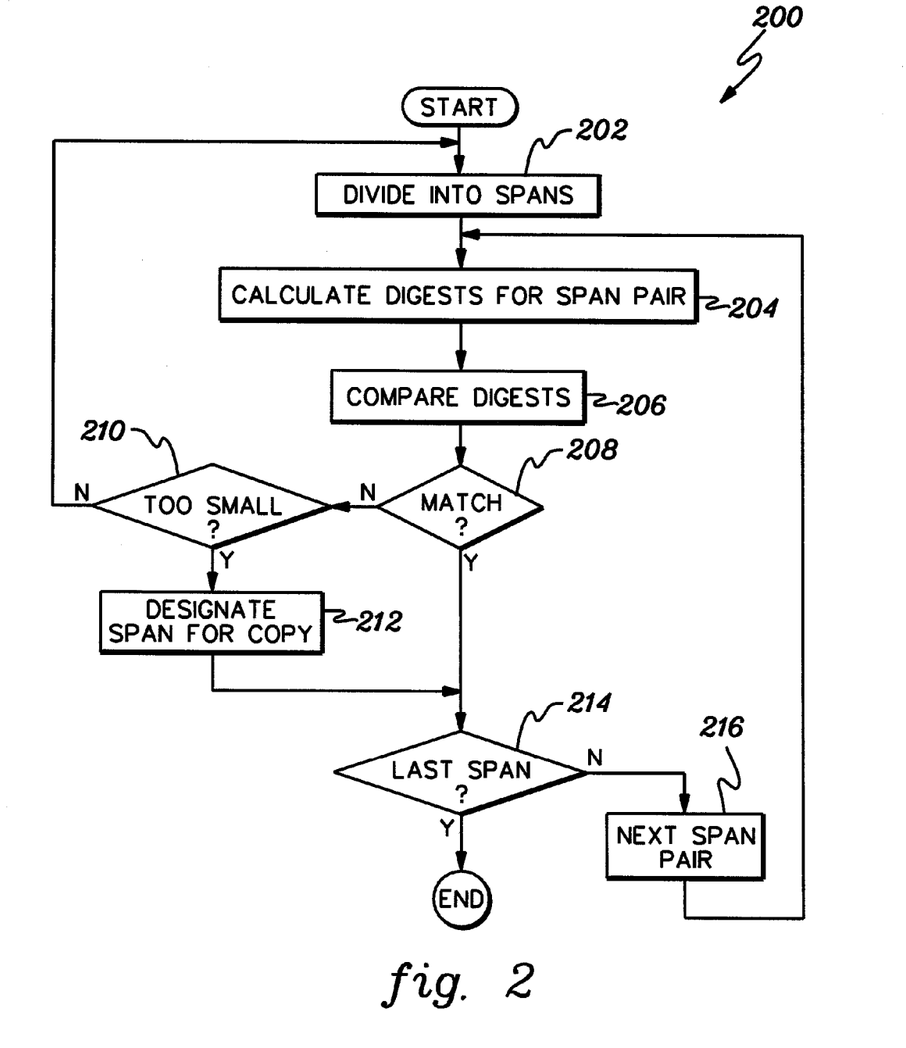
FIG. 2 is a flow diagram for one example of a method of replicating data from one block storage resource to another in accordance with the present invention.

Block storage resources 102 and 104 are each initially divided into a predetermined number of equal-sized spans of storage blocks, creating corresponding span pairs (Step 202). For a given span pair, a digest calculation is generated for each span (Step 204). In the present example, the digest calculation for the span in question on block storage resource 102 would be performed by storage controller 106, and the digest calculation for the corresponding span on block storage resource 104 would be performed by storage controller 108. One of the storage controllers then sends the result of the digest calculation to the other for comparison (Step 206).

If the digest calculations for a span pair match (Inquiry 208), and that was the last span pair to be processed (Inquiry 214), the method ends. Although a checksum match does not definitively mean the spans are identical in content, there is a very high likelihood that they are, especially where more sophisticated checksum calculation methods are used. If there are more span pairs to be processed (Step 216), then the method returns to Step 204. If the digest calculations do not match, indicating differences in the content of the corresponding spans in block storage resources 102 and 104, the method checks to see if the current storage block span is smaller than a predetermined minimum size (Inquiry 210).

If the current span is too small, then the span on block storage resource 102 is designated for copying (Step 212). If the current span pair is not too small, then each span is divided into at least two identically-sized smaller spans (Step 202), the method continuing iteratively to identify the reasonably smallest spans that do not have digest matches, thereby reducing the number of storage blocks that are actually copied, and improving performance. If the current span pair is the last to be processed (Inquiry 214), the method ends. Otherwise, it proceeds to the next span pair (Step 216) and back to digest calculations at step 204. After all span pairs have been processed, the blocks identified for copying can be copied.

Optionally, instead of only one of the storage controllers sending the result of the current digest calculation to the other, both could send their results to the other simultaneously. Thus, one end could be working on one span pair, while the other side works on another, potentially doubling the speed of the process, especially over a slow link. A similar result can be achieved by mixing read-style and write-style (see below) digest calculation commands, as they have different data directions, even though running the program only on one side.

Figure 3:
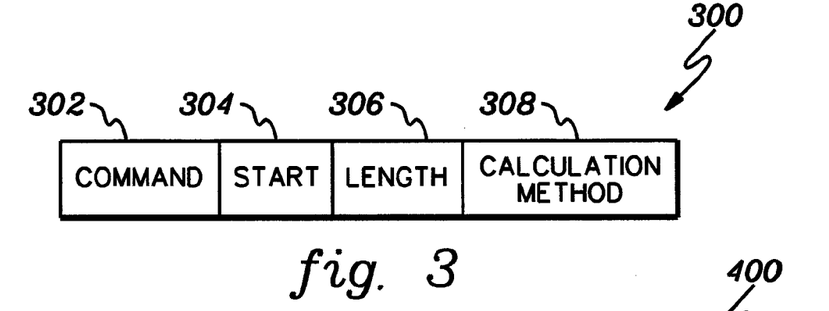
FIG. 3 depicts the parameters for a read style digest-calculation command.

The SCSI (SAM) allows equipment vendors to define their own SCSI commands, which can of course be used with the iSCSI transport protocol. This fact can be used to provide a means of triggering the digest calculations called for in the method of the present invention. Thus, while a command to trigger a digest calculation would be somewhat different from vendor to vendor, the basic parameters of such a command would be the same. FIG. 3 is one example of a simplified block diagram of a read-style digest-calculation command block 300. The command block comprises the command itself 302, which will vary from vendor to vendor, and an indication of the block range(s). In the present example, there is only one range (span) at a given time, so the beginning of the range 304 is provided, along with the length 306 of the range. If there were additional ranges, there would be additional "start" and "length" parameters in the command block. Finally, the command block indicates the calculation method to use 308.

As one skilled in the art will know, there are various checksum calculation methods that could be used. For example, RipeMD-160, SHA1, SHA256, MD4 and MD5 to name a few.

In operation, the command block is created and sent into the iSCSI command stream as a "generic" SCSI command by the client seeking to compare the block ranges of the storage devices, using the same ioctl system call on the same file descriptor as standard read/write commands. As one skilled in the art will know, "ioctl" is a UNIX (LINUX) system API call that handles special device functions.

As one skilled in the art will know, iSCSI stands for Internet SCSI (Small Computer System Interface), an Internet Protocol (IP)-based storage networking standard for linking data storage resources. By carrying SCSI commands over IP networks, iSCSI is used to facilitate data transfers over networks, for example, intranets and wide area networks. When an end user or application sends a request, the operating system generates the appropriate SCSI commands and data request, which then go through encapsulation and, if necessary, encryption procedures. A packet header is added before the resulting IP packets are transmitted over an Ethernet connection. When a packet is received, it is decrypted (if it was encrypted before transmission), and disassembled, separating the SCSI commands and request. The SCSI commands are sent on to the SCSI controller, and from there to the SCSI storage device. Because iSCSI is bi-directional, the protocol can also be used to return data in response to the original request. Of course, the present invention may also be implemented using fiber channel, rather than iSCSI, or some other appropriate transport protocol.

An even more efficient way to accomplish the comparison is to create a SCSI command that not only performs the digest calculation, but also does the comparison. In this way, the requesting client could send the command described in FIG. 3 to one of the storage controllers, wait for the result (i.e., the digest), and send the calculation and comparison command with the digest to the other storage controller.

Figure 4:
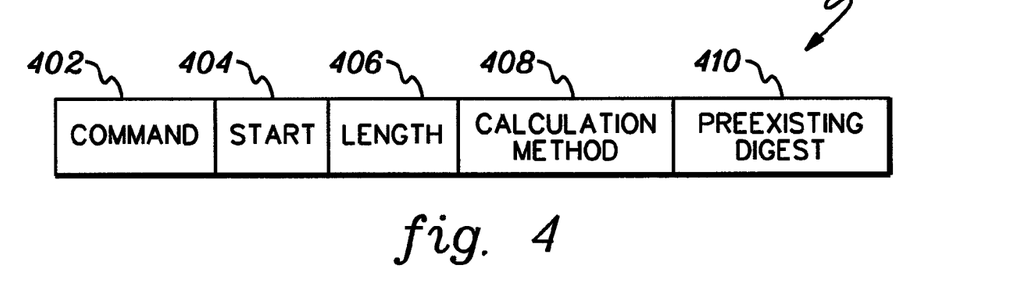
FIG. 4 depicts the parameters for a write style (the function is more accurately described as read-and-compare) digest-calculation command.

FIG. 4 is one example of a simplified block diagram of a write-style digest-calculation and compare command block 400 in accordance with another aspect of the present invention. The command block comprises the command itself 402, which will vary from vendor to vendor, and an indication of the block range(s). In the present example, there is only one range, so the beginning of the range 404 is provided, along with the length 406 of the range. If there were additional ranges, there would be additional "start" and "length" parameters in the command block. The command block further indicates the calculation method to use 408, along with the results of a preexisting digest calculation 410. Such a command would result in the storage controller receiving it performing the requested digest calculation on the contents of the indicated block range, and then comparing that calculation to the preexisting calculation received with the command. The controller could then return to the client the results of the comparison in the form of a "match" or "no match" indication.

Figure 5:
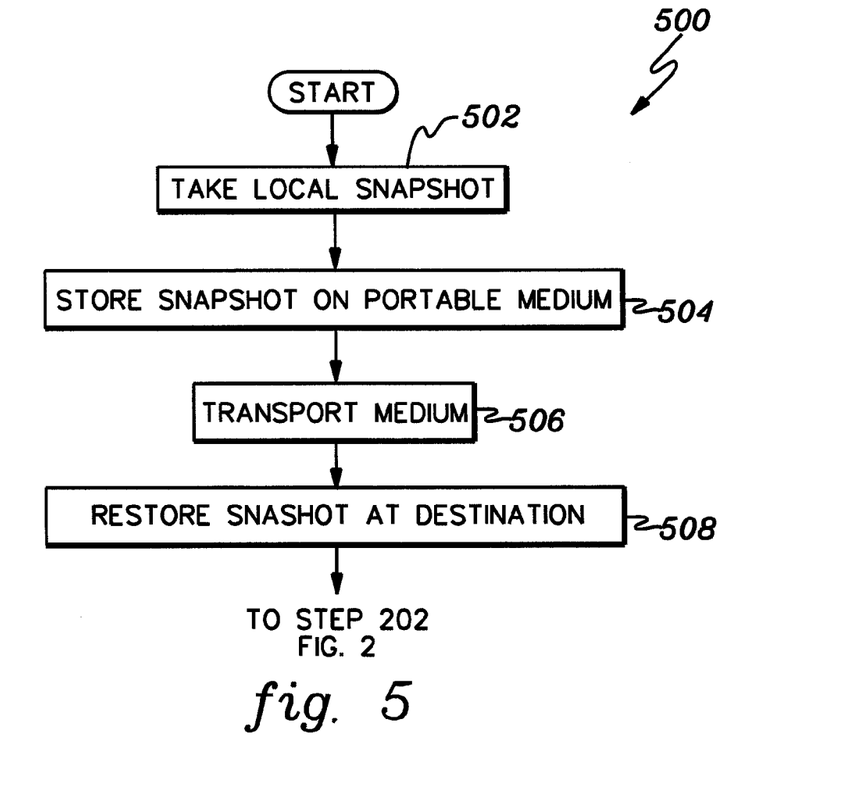

In another aspect of the present invention, a method of replicating large block storage resources over wide-area networks is provided. The method will now be described with reference to the computing environment 100 of FIG. 1, in conjunction with the flow diagram 500 of FIG. 5. Assume that block storage resources 102 and 104 are large volumes remote from one another on a wide area network 110. Assume also that it is desired to replicate block storage resource 102, a high-availability resource, in its entirety to block storage resource 104. Being that resource 102 is a large volume, it is impractical to copy all blocks across the network without interrupting access to resource 102. Initially, a local snapshot is taken of block storage resource 102 (Step 502). The contents of the block storage resource are copied onto storage, for example, a portable data storage medium (Step 504), for example, magnetic tape, hard disk, flash or optical storage. The copy is then transported to the destination (Step 506), if on a portable storage medium, and restored (Step 508). Any physical transportation method for the portable storage medium can be used. The restoration is preferably direct from the storage medium. The restoration is done using, for example, a simple block-by-block copy from the storage medium (portable or otherwise) to the replica. The copy could also be made via an iSCSI link, as another example. The method of the first aspect is then used to identify and copy blocks across the network that have been modified since the snapshot.

As one skilled in the art will know, snapshots are facilitated by so-called Copy-On-Write (COW) technology, explained more fully below. In addition, a snapshot does not actually make a copy of the data. Rather, as noted above, pointers (i.e., entries in exception tables) are used in conjunction with copies of blocks that are modified, in order to keep a record of the state of the data at the time of the snapshot. Each exception table entry is essentially a pointer with at least the block or chunk number in origin block storage resource that has been overwritten, and an address for the area of the COW that contains the origin data prior to being overwritten. There could also be additional information in an exception table entry, such as, for example, a timestamp of the creation of the entry. In this way, data can be frozen for various uses without actually affecting the data and without, for example, making an actual copy and sending a large amount of data, saving time and bandwidth. Exception tables actually exist both in memory for consulting, and as part of a COW for persistency, so that a table could be restored after a restart.

For purposes of snapshots, COW occurs when a write operation for a block is directed towards the origin resource that has one or more snapshots. In the present example, a single COW per volume is assumed, which is shared by snapshots of the same volume. However, it will be understood that a separate COW could be created for each snapshot, rather than using different areas of the same COW. If the block has not been written since the last snapshot, then before the write operation occurs, the content of the block is read and written out to a specially allocated storage area called "COW device." Simultaneously, a corresponding exception table entry is created. Then the origin resource block is written with a new data. Subsequently, if the origin resource is read, then it would return the data from the block that was just written out; if the snapshot is read, then the exception table is consulted first, and since there is an entry for this block, the content is returned from the COW device. Note that an exception table is preferably created for each snapshot. However, a single exception table for multiple storage resources could be used, so long as the resource from which a snapshot is taken is clearly identified.

In the present invention, the snapshots can be used both for initial synchronization and for achieving more stable digest calculation results on storage volumes with content that may change even during the replication. For the initial synchronization, a snapshot of the origin block storage resource can be taken and then copied fully to the replica block storage resource, either directly or by means of a portable storage device, such as, for example, magnetic tape, hard disk, flash or optical storage. For the subsequent replication passes, each pass comprises four steps. As the first step, a snapshot of the origin volume is produced, creating a volume identical to the origin at the time of the snapshot, and that is frozen. As the second step, the replication method described above is applied using the snapshot in place of the origin volume. Since the snapshot is static, the replication process will produce an exact copy of the snapshot on the remote resource. At this point, the replica is consistent, so that as the third step, the snapshot of the replica can be taken, for example, by means of a vendor-specific SCSI command or otherwise, and can be used to send the command via iSCSI. A snapshot of the replica provides a consistent copy of the replica that is always available, in case, for example, communications with the replica are offline. As step four, the origin snapshot is discarded, and the process restarts from the first step. The benefits of this approach are that only one replication pass is required to bring the replica volume in sync with the snapshot of the origin, because it is frozen, and that at any time there is a valid replica snapshot, making this approach suitable for disaster recovery scenarios.

The above-described computing environment and/or computing units are only offered as examples. The present invention can be incorporated and used with many types of computing units, computers, processors, nodes, systems, work stations and/or environments without departing from the spirit of the present invention. Additionally, while some of the embodiments described herein are discussed in relation to particular transport protocols, such embodiments are only examples. Other types of computing environments can benefit from the present invention and, thus, are considered a part of the present invention.

The present invention can include at least one program storage device readable by a machine, tangibly embodying at least one program of instructions executable by the machine to perform the capabilities of the present invention. The program storage device can be provided separately, or as a part of a computer system.

The figures depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the invention.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A method of replicating data from a first block storage resource to a second block storage resource, comprising:
   identifying differences between a first block span of the first block storage resource and an equal-sized second block span of the second block storage resource, wherein the first block span and the second block span start at a same block number; and
   copying the first block span to the second block storage resource only if differences are identified.

2. The method of claim 1, wherein the identifying comprises performing a first digest calculation on the first block span, performing a second digest calculation on the second block span, and comparing results of the first digest calculation and the second digest calculation, and wherein the copying comprises copying the first block span to the second block storage resource only if the comparing indicates no match.

3. The method of claim 2, wherein a first controller controls the first block storage resource and a second controller controls the second block storage resource, wherein the first digest calculation is performed by the first controller and the second digest calculation is performed by the second controller, and wherein the comparing comprises one of the first controller and the second controller sending digest calculation results to the other for comparing.

4. The method of claim 1, further comprising, prior to the identifying and copying:
   taking a snapshot of the first block storage resource;
   copying the contents of the first block storage resource from the snapshot; and
   restoring the copied contents at the second block storage resource.

5. The method of claim 4, further comprising, after copying the identified differences:
   taking another snapshot of the first block storage resource;
   copying the contents of the first block storage resource from the another snapshot;
   restoring the copied contents at the second block storage resource;
   identifying differences between a first block span of the first block storage resource and an equal-sized second block span of the second block storage resource, wherein the first block span and the second block span start at a same block number;
   copying the first block span to the second block storage resource only if differences are identified;
   taking a snapshot of the second block storage resource;
   discarding the another snapshot; and
   repeating the taking, copying, restoring, identifying, copying, taking, discarding and repeating.

6. A method of replicating data from a first block storage resource to a second block storage resource, comprising:
   dividing a first portion of the first block storage resource and a second portion of the second block storage resource into at least two block span pairs, each block span pair comprising a block span from the first block storage resource and an equal-sized block span from the second block storage resource, wherein each block span of a given block span pair starts at a same block number;
   performing digest calculations for each of the block spans of a block span pair;
   comparing results of the digest calculations;
   if the digest calculations do not match, and each of the block spans of the block span pair are at least a minimum size, dividing the first block span pair into at least two smaller block span pairs, each smaller block span pair comprising a smaller block span from the first block storage resource and an equal-sized smaller block span from the second block storage resource, wherein each block span of a given block span pair starts at a same block number;
   if the digest calculations do not match, and each of the block spans of the block span pair are smaller than a minimum size, designating the block span of the first block storage resource for copying; and
   repeating the performing, comparing dividing and designating until there are no more block span pairs.

7. The method of claim 6, wherein a first controller controls the first block storage resource and a second controller controls the second block storage resource, wherein digest calculations for the first block storage resource are performed by the first controller and digest calculations for the second block storage resource are performed by the second controller, and wherein the comparing comprises one of the first controller and the second controller sending digest calculation results to the other for comparing.

8. The method of claim 6, further comprising copying any block spans from the first block storage resource to the second block storage resource that have been designated for copying.

9. The method of claim 6, wherein the minimum size comprises a predetermined minimum size.

10. The method of claim 6, wherein the performing comprises performing the calculations in response to receipt of a digest calculation command.

11. The method of claim 10, wherein a first controller controls the first block storage resource and a second controller controls the second block storage resource, and wherein the performing comprises each of the first controller and the second controller receiving a digest calculation command.

12. The method of claim 11, wherein the first controller and the second controller are coupled via a network, and wherein the digest calculation command comprises a vendor-specific iSCSI command.

13. The method of claim 10, wherein a first controller controls the first block storage resource and a second controller controls the second block storage resource, and wherein the means for performing and the means for comparing comprises one of the first controller and the second controller receiving a digest calculation command to produce a first digest calculation, and the other of the first controller and the second controller receiving command to perform a digest calculation and compare the results to the first digest calculation.

14. A system for replicating data, comprising:
a first block storage resource;
a second block storage resource;
means for identifying differences between a first block span of the first block storage device and an equal-sized second block span of the second block storage resource, wherein the first block span and the second block span start at a same block number; and
means for copying the first block span to the second block storage resource only if differences are identified.

15. The system of claim 14, wherein the means for identifying comprises means for performing a first digest calculation on the first block span, means for performing a second digest calculation on the second block span, and means for comparing results of the first digest calculation and the second digest calculation, and wherein the means for copying comprises means for copying the first block span to the second block storage resource only if the comparing indicates no match.

16. The system of claim 15, wherein the means for performing the first digest calculation comprises a first controller, wherein the means for performing the second digest calculation comprises a second controller, and wherein the means for comparing comprises one of the first controller and the second controller adapted to send digest calculation results to the other for comparing.

17. The system of claim 14, further comprising, prior to the identifying and copying:
means for taking a snapshot of the first block storage resource;
means for copying the contents of the first block storage resource from the snapshot; and
means for restoring the copied contents at the second block storage resource.

18. The system of claim 17, further comprising, after copying the identified differences:
means for taking another snapshot of the first block storage resource;
means for copying the contents of the first block storage resource from the another snapshot;
means for restoring the copied contents at the second block storage resource;
means for identifying differences between a first block span of the first block storage resource and an equal-sized second block span of the second block storage resource, wherein the first block span and the second block span start at a same block number;
means for copying the first block span to the second block storage resource only if differences are identified;
means for taking a snapshot of the second block storage resource;
means for discarding the another snapshot; and
means for repeating the taking, copying, restoring, identifying, copying, taking, discarding and repeating.

19. A system for replicating data, comprising:
a first block storage resource;
a second block storage resource;
means for dividing a first portion of the first block storage resource and a second portion of the second block storage resource into at least two block span pairs, each block span pair comprising a block span from the first block storage resource and an equal-sized block span from the second block storage resource, wherein each block span of a given block span pair start at a same block number;
means for performing digest calculations for each of the block spans of a block span pair;
means for comparing results of the digest calculations;
if the digest calculations do not match, and each of the block spans of the block span pair are at least a minimum size, means for dividing the first block span pair into at least two smaller block span pairs, each smaller block span pair comprising a smaller block span from the first block storage resource and an equal-sized smaller block span from the second block storage resource, wherein each block span of a given block span pair start at a same block number;
if the digest calculations do not match, and each of the block spans of the block span pair are smaller than a minimum size, means for designating the block span of the first block storage resource for copying; and
means for repeating the performing, comparing, dividing and designating until there are no more block span pairs.

20. The system of claim 19, wherein the means for performing the first digest calculation comprises a first controller, wherein the means for performing the second digest calculation comprises a second controller, and wherein the means for comparing comprises one of the first controller and the second controller adapted to send digest calculation results to the other for comparing.

21. The system of claim 19, further comprising means for copying any block spans from the first block storage resource to the second block storage resource that have been designated for copying.

22. The system of claim 19, wherein the minimum size comprises a predetermined minimum size.

23. The system of claim 19, wherein the means for performing comprises means for performing the calculations in response to receipt of a digest calculation command.

24. The system of claim 23, wherein the means for performing comprises a first controller for the first block storage resource and a second controller for the second block storage resource.

25. The system of claim 24, wherein the first controller and the second controller are coupled via a network, and wherein the digest calculation command comprises a vendor-specific iSCSI command.

26. The system of claim 23, wherein the means for performing and the means for comparing comprise one of a first controller for the first block storage resource and a second controller for the second block storage resource adapted to receive a digest calculation command to produce a first digest calculation, and the other of the first controller and the second controller adapted to receive a command to perform a digest calculation and compare the results to the first digest calculation.

27. At least one program storage device readable by a machine tangibly embodying at least one program of instructions executable by the machine to perform a method of replicating data from a first block storage resource to a second block storage resource, comprising:
    identifying differences between a first block span of the first block storage resource and an equal-sized second block span of the second block storage resource, wherein the first block span and the second block span start at a same block number; and
    copying the first block span to the second block storage resource only if differences are identified.

28. The at least one program storage device of claim 27, wherein the identifying comprises performing a first digest calculation on the first block span, performing a second digest calculation on the second block span, and comparing results of the first digest calculation and the second digest calculation, and wherein the copying comprises copying the first block span to the second block storage resource only if the comparing indicates no match.

29. The at least one program storage device of claim 28, wherein a first controller controls the first block storage resource and a second controller controls the second block storage resource, wherein the first digest calculation is performed by the first controller and the second digest calculation is performed by the second controller, and wherein the comparing comprises one of the first controller and the second controller sending digest calculation results to the other for comparing.

30. The at least one program storage device of claim 27, further comprising, prior to the identifying and copying:
    taking a snapshot of the first block storage resource;
    copying the contents of the first block storage resource from the snapshot; and
    restoring the copied contents at the second block storage resource.

31. The at least one program storage device of claim 30, further comprising, after copying the identified differences:
    taking another snapshot of the first block storage resource;
    copying the contents of the first block storage resource from the another snapshot;
    restoring the copied contents at the second block storage resource;
    identifying differences between a first block span of the first block storage resource and an equal-sized second block span of the second block storage resource, wherein the first block span and the second block span start at a same block number;
    copying the first block span to the second block storage resource only if differences are identified;
    taking a snapshot of the second block storage resource;
    discarding the another snapshot; and
    repeating the taking, copying, restoring, identifying, copying, taking, discarding and repeating.

32. At least one program storage device readable by a machine tangibly embodying at least one program of instructions executable by the machine to perform a method of replicating data from a first block storage resource to a second block storage resource, comprising:
    dividing a first portion of the first block storage resource and a second portion of the second block storage resource into at least two block span pairs, each block span pair comprising a block span from the first block storage resource and an equal-sized block span from the second block storage resource, wherein each block span of a given block span pair start at a same block number;
    performing digest calculations for each of the block spans of a block span pair;
    comparing results of the digest calculations;
    if the digest calculations do not match, and each of the block spans of the block span pair are at least a minimum size, dividing the first block span pair into at least two smaller block span pairs, each smaller block span pair comprising a smaller block span from the first block storage resource and an equal-sized smaller block span from the second block storage resource, wherein each block span of a given block span pair start at a same block number;
    if the digest calculations do not match, and each of the block spans of the block span pair are smaller than a minimum size, designating the block span of the first block storage resource for copying; and
    repeating the performing, comparing dividing and designating until there are no more block span pairs.

33. The at least one program storage device of claim 32, wherein a first controller controls the first block storage resource and a second controller controls the second block storage resource, wherein digest calculations for the first block storage resource are performed by the first controller and digest calculations for the second block storage resource are performed by the second controller, and wherein the comparing comprises one of the first controller and the second controller sending digest calculation results to the other for comparing.

34. The at least one program storage device of claim 32, further comprising copying any block spans from the first block storage resource to the second block storage resource that have been designated for copying.

35. The at least one program storage device of claim 32, wherein the minimum size comprises a predetermined minimum size.

36. The at least one program storage device of claim 32, wherein the performing comprises performing the calculations in response to receipt of a digest calculation command.

37. The at least one program storage device of claim 36, wherein a first controller controls the first block storage resource and a second controller controls the second block storage resource, and wherein the performing comprises each of the first controller and the second controller receiving a digest calculation command.

38. The at least one program storage device of claim 37, wherein the first controller and the second controller are coupled via a network, and wherein the digest calculation command comprises a vendor-specific iSCSI command.

39. The at least one program storage device of claim 36, wherein a first controller controls the first block storage resource and a second controller controls the second block storage resource, and wherein the performing and the comparing comprises one of the first controller and the second controller receiving a digest calculation command to produce a first digest calculation, and the other of the first controller and the second controller receiving command to perform a digest calculation and compare the results to the first digest calculation.

* * * * *

UNITED STATES PATENT AND TRADEMARK OFFICE
CERTIFICATE OF CORRECTION

PATENT NO.       : 7,512,756 B2                                   Page 1 of 1
APPLICATION NO.  : 11/470537
DATED            : March 31, 2009
INVENTOR(S)      : Malkin

It is certified that error appears in the above-identified patent and that said Letters Patent is hereby corrected as shown below:

Col. 1, Lines 25-26: Delete "Malkin et al., entitled "BLOCK SNAPSHOTS OF iSCSI" and insert --Kirill Malkin, entitled "BLOCK SNAPSHOTS OVER iSCSI"--

Col. 1, Lines 30-31: Delete "Kirill Malkin" and insert --Malkin et al.--

Signed and Sealed this

Thirtieth Day of June, 2009

JOHN DOLL
*Acting Director of the United States Patent and Trademark Office*